(12) United States Patent
Forsberg

(10) Patent No.: US 8,629,702 B2
(45) Date of Patent: Jan. 14, 2014

(54) DIGITAL CLOCK REGENERATOR

(75) Inventor: Gunnar Forsberg, Stockholm (SE)

(73) Assignee: Transmode Systems AB, Stockholm (SE)

(*) Notice: Subject to any disclaimer, the term of this patent is extended or adjusted under 35 U.S.C. 154(b) by 0 days.

(21) Appl. No.: 13/576,496

(22) PCT Filed: Feb. 17, 2010

(86) PCT No.: PCT/EP2010/051973
§ 371 (c)(1),
(2), (4) Date: Aug. 1, 2012

(87) PCT Pub. No.: WO2011/101025
PCT Pub. Date: Aug. 25, 2011

(65) Prior Publication Data
US 2012/0293224 A1    Nov. 22, 2012

(51) Int. Cl.
*H03L 7/06* (2006.01)
(52) U.S. Cl.
USPC .......................... 327/158; 327/165; 327/175
(58) Field of Classification Search
USPC .......................................... 327/158, 165, 175
See application file for complete search history.

(56) References Cited

U.S. PATENT DOCUMENTS

| | | | |
|---|---|---|---|
| 4,310,795 A | 1/1982 | Fremerey | |
| 4,462,110 A | 7/1984 | Baldwin et al. | |
| 4,707,653 A | 11/1987 | Wagner | |
| 5,614,855 A * | 3/1997 | Lee et al. | 327/158 |
| 6,219,396 B1 | 4/2001 | Owada | |
| 7,447,277 B2 | 11/2008 | Yajima et al. | |

FOREIGN PATENT DOCUMENTS

| | | |
|---|---|---|
| EP | 0599311 A2 | 6/1994 |
| EP | 1865649 A1 | 12/2007 |
| WO | WO 93/12600 A1 | 6/1993 |

OTHER PUBLICATIONS

Aguiar, R. L., et al., "Design and Performance of 155 Mbps Clock/Data Recovery Circuits on Heavy Loaded PLDs," Analog Integrated Circuits and Signal Processing, 2005, pp. 159-170, vol. 43, Springer Science + Business Media, Inc., The Netherlands.
International Searching Authority, International Search Report for International Application No. PCT/EP2010/051973, mailed Nov. 5, 2010, 3 pages.
European Patent Office, Communication Pursuant To Article 94(3) EPC for Application No. 10708512.8, May 23, 2013, 6 pages, Germany.

* cited by examiner

*Primary Examiner* — John Poos
(74) *Attorney, Agent, or Firm* — Alston & Bird LLP

(57) ABSTRACT

A sampling unit (110) receives an input clock signal ($CLK_{in}$) having a varying period time, and samples the input clock signal ($CLK_{in}$) based on a sampling clock signal ($CLK_{smpl}$) that has a frequency being substantially higher than an average frequency of the input clock signal ($CLK_{in}$). The sampling unit (110) produces a respective period length value (PL) for each period of the input clock signal ($CLK_{in}$). An averaging unit (120) receives a number of period length values (PL) from the sampling unit (110), and based thereon produces an average period length value ($PL_{avg}$) representing an average period time for the input clock signal ($CLK_{in}$) over an averaging interval including a number of periods equivalent to said number of period length values (PL). An output unit (151) produces a stabilized output clock signal ($CLK_{out}$) based on the average period length value ($PL_{avg}$) and the sampling clock signal ($CLK_{smpl}$).

28 Claims, 2 Drawing Sheets

DIGITAL CLOCK REGENERATOR

CROSS REFERENCE TO RELATED APPLICATIONS

This application is a national stage application, filed under 35 U.S.C. §371, of International Application No. PCT/EP2010/051973, filed Feb. 17, 2010, which is hereby incorporated by reference in its entirety.

BACKGROUND OF THE INVENTION

1. Related Field

The present invention relates generally to stabilization of clock signals. More particularly the invention relates to a clock regenerator for generating a stabilized output clock signal and a method for the same. The invention also relates to an associated computer program and computer readable medium.

2. Related Art

Traditionally, a so-called phase locked loop (PLL) circuit has been used to make certain that the clock signal of a digital design fulfils specific quality criteria, such as regarding frequency and phase stability. However, the PLL design requires analog components, and therefore cannot be integrated into a purely digital design, for example realized in a field-programmable gate array (FPGA). This is disadvantageous because an all-digital (without analog building blocks) design would, in most cases, be a more cost efficient alternative.

WO93/12600 and U.S. Pat. No. 6,219,396 describe de-jittering designs for regenerating clock signals, and EP 599 311 shows a clock recovery circuit. All three documents represent different forms of PLLs.

Various non-PLL solutions are also known for recovering signals that have deteriorated. Some of these solutions can be employed to stabilize a clock signal having a varying frequency.

Aguiar, R. L. et al., "Design and Performance of 155 Mbps Clock/Data Recovery Circuits on Heavy Loaded PLDs", Analog Integrated Circuits and Signal Processing, 43, 159-170, 2005 reveals an all-digital mechanism for selecting a signal having optimal properties. Here, so-called phase picking is used to select the most appropriate sample as the recovered data, or the most appropriate phase as the recovered clock. However, no averaging is performed in respect of the input clock signal.

EP 1 865 649 describes an overall digital clock and recovery solution using both oversampling and tracking. Here, an input data stream is oversampled by a high-frequency clock. The input data stream is tracked by locating transitions between adjacent samples of the oversampled stream and by moving a no-transition area within the oversampled stream wherein no transitions between adjacent samples are found. A resulting recovered data signal is obtained as a central portion of the no-transition area. The recovered clock signal is generated by dividing the high-frequency clock used for said oversampling. However, there is no teaching or suggestion that the average period time of the input clock signal should be determined.

U.S. Pat. No. 4,310,795 discloses a solution for monitoring the characteristics of a periodic signal used in telemetry. Specifically, a circuit is described which measures the average period of a low-frequency periodic signal by counting stepping pulses from a high-frequency pulse generator and resetting pulses from a phase-angle detector monitoring the periodic signal. A first shift register is loaded with a count for each stepping pulse, and an adder at the output of the first shift register emits a signal coding the sum of all stepping pulses. A second shift register is loaded with the output sums of the adder and has a first and last storage cell connected to a subtractor, which emits a signal indicating changes in the average period of the low-frequency signal. Hence, any deviations from a desired frequency can be detected. However, the low-frequency signal as such remains unaltered.

Consequently, various solutions are known for regenerating deteriorated signals. A solution is also known for determining the average period of a cyclic signal. Nevertheless, there is no prior all-digital solution capable of replacing a traditional PLL circuit.

BRIEF SUMMARY

The object of the present invention is to solve the above problem and provide an efficient, reliable and cost-efficient solution for generating a stabilized clock signal, and which solution is suitable for digital integration.

According to one aspect of the invention, the object is achieved by the clock regenerator as initially described, wherein the clock regenerator includes an averaging unit and an output unit. The averaging unit is configured to receive a number of period length values from the sampling unit, and based thereon produce an average period length value representing an average period time for the input clock signal over an averaging interval including a number of periods equivalent to said number of period length values. The output unit is configured to produce the stabilized output clock signal based on the average period length value and the sampling clock signal.

This design is advantageous because it can produce a clean clock signal based on a source clock signal full of jitter and/or phase modulation while preserving the key properties of the source clock signal enabling synchronization to be maintained.

According to one preferred embodiment of this aspect of the invention, the averaging unit is configured to produce the average period length value, such that the average period length value equals the duration of an integer number of periods of the sampling clock signal. The averaging unit is further configured to determine a rounding error value representing a difference between a calculated average period length for the averaging interval and the average period length value, and compensate for the rounding error value when producing a future average period length value, so that a long time average of the average period length value becomes equal to a long time average of the calculated period length. Consequently (irrespective of whether the average period length value is rounded up or down from the calculated average period length), no systematic error is introduced. It is therefore ensured that the stabilized output clock signal is a phase-true representation of the input clock signal.

According to another preferred embodiment of this aspect of the invention, the averaging unit is configured to calculate the average period length value on the further basis of a weight function assigning different weights to at least two period length values of said number of period length values in the averaging interval. Such a determination of the average period length value is advantageous if for example it is desired that the stabilized output clock signal is more responsive to any frequency fluctuations in the input clock signal. Namely, the weight function historic renders it possible to give less influence to earlier period length values than to a current, or more recent period length values.

According to a further preferred embodiment of this aspect of the invention, the averaging unit is configured to update the average period length value (as well as the calculated average period length) on a rolling basis. This means that each non-initial average period length value (or calculated average period length) represents an averaging interval overlapping a foregoing averaging interval. This kind of rolling averaging is advantageous, since thereby any frequency variations in the stabilized output clock signal can be made relatively smooth and gradual.

Of course, it is not technically precluded that the average period length value (and/or the calculated average period length) be updated in a non-overlapping manner. Hence, according to yet another preferred embodiment of this aspect of the invention, the averaging unit is configured to calculate and update the average period length value at a predefined interval equivalent to at least two periods of the input clock signal. Here, instead, each average period length value represents an averaging interval that is free from overlaps with any foregoing averaging intervals.

According to another preferred embodiment of this aspect of the invention, the clock regenerator includes an accumulator unit which is configured to receive each average period length value, and based thereon produce a respective time point value indicating a time point at which a given pulse of the stabilized output clock signal shall be generated. Thus, it becomes a relatively straightforward task to produce the stabilized output clock signal. Preferably, a buffer unit receives the time point values from the accumulator unit, and temporarily stores at least one of these values. The output unit is then further preferably configured to read out an oldest value of said time point values stored in the buffer unit, and for each read-out time point value produce a pulse of the stabilized output clock signal at a time point indicated by the read-out time point value According to still another preferred embodiment of this aspect of the invention, the clock regenerator also includes a counter unit. This unit is configured to repeatedly produce a time value count representing a number of cycles completed by the sampling clock signal since a reference time point. The output unit is here specifically configured to: receive the time value count; compare the time value count with the time point value read out from the buffer unit; when time value count matches the current time point value, produce a pulse of the stabilized output clock signal; and thereafter read out a subsequent time point value from the buffer unit, and so on. Consequently, the stabilized output clock signal can be produced in a reliable manner.

According to an alternative preferred embodiment of this aspect of the invention, the clock regenerator instead includes a buffer unit receiving the average period length value directly from the averaging unit. The buffer unit temporarily stores each received average period length value, and forwards the stored average period length values on a first-in-first-out basis to the output unit in response to request messages. Thereby, for each received request message, an oldest stored average period length value is forwarded. Here, the output unit is further preferably configured to receive the average period length value from the buffer unit; produce the stabilized output clock signal, such that each period thereof has a duration as indicated by a latest received average period length value; and send a request message to the buffer unit after completion of each period of the stabilized output clock signal. Hence, the output clock signal is produced in a reliable, however alternative, manner relative to what is described in the previous paragraph.

According to yet another preferred embodiment of this aspect of the invention, the clock regenerator includes a delaying unit and a delay adjustment unit. The delaying unit is configured to: receive at least one rounding error value from the averaging unit, delay each of said received at least one rounding error value, and thus produce a respective delayed rounding error value. The delay adjustment unit is configured to: receive the stabilized output clock signal produced by the output unit, receive the delayed rounding error value from the delaying unit, and in response thereto produce a de-jittered clock signal which is delayed relative to output clock signal produced by the output unit. The delay is here a function of the delayed rounding error value, and the delaying unit is configured to delay each of said received at least one rounding error value such that in the delay adjustment unit the respective delayed rounding error value influences a period of the output clock signal to which the rounding error value in question relates. This type of delay adjustment is advantageous because thereby extremely high resolution of the stabilized output clock is attainable. For example, as will be explained in the following detailed description of the invention, a sampling clock rate of 5 GHz may produce a resolution as high as 0.098 ps.

According to a further preferred embodiment of this aspect of the invention, the clock regenerator includes a frequency conversion unit configured to receive the sampling clock signal and based thereon produce a modified sampling clock signal having a frequency that is either a predetermined factor higher than, or a predetermined fraction of the sampling clock signal. Thereby, the output unit is not limited to produce the stabilized output clock signal directly from the sampling clock signal. Instead, the stabilized output clock signal can be produced based on the modified sampling clock signal, and thus the level of design flexibility is improved.

According to another aspect of the invention, the object is achieved by the method described initially, wherein the period length values are averaged over a number of periods equivalent to the number of period length values represented by the sampled input clock signal. Thus, an average period length value is produced representing an average period time for the input clock signal over an averaging interval including a number of periods equivalent to said number of period length values. The stabilized output clock signal is then produced based on the average period length value and the sampling clock. The advantages of this method, as well as the preferred embodiments thereof, are apparent from the discussion above with reference to the proposed clock regenerator.

According to a further aspect of the invention the object is achieved by a computer program, which is directly loadable into the memory of a computer, and includes software adapted to implement the method proposed above when said program is run on a computer.

According to another aspect of the invention the object is achieved by a computer readable medium, having a program recorded thereon, where the program is to control a computer to perform the method proposed above when the program is loaded into the computer.

Further advantages, beneficial features and applications of the present invention will be apparent from the following description and the dependent claims.

BRIEF DESCRIPTION OF THE FIGURES

The present invention is now to be explained more closely by means of preferred embodiments, which are disclosed as examples, and with reference to the attached drawings.

DETAILED DESCRIPTION OF THE VARIOUS EMBODIMENTS

Figure 1:
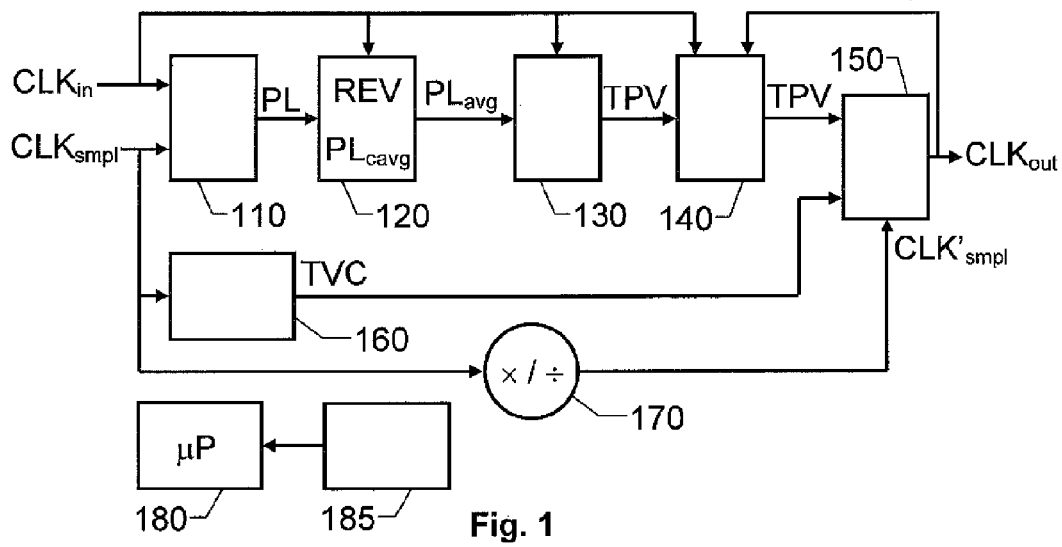
FIG. 1 shows a block diagram of a clock regenerator according to a first embodiment of the invention.

We refer initially to FIG. 1, which shows a block diagram of a clock regenerator according to a first embodiment of the invention. The clock regenerator includes a sampling unit 110, an averaging unit 120 and an output unit 150. Preferably, the clock regenerator also has an accumulator unit 130 and a buffer unit 140, and is further associated with a processor unit 180 and a computer readable medium 185.

The sampling unit 110 is configured to receive an input clock signal $CLK_{in}$, having a varying period time, and receive a sampling clock signal $CLK_{smpl}$. The sampling clock signal $CLK_{smpl}$ has a frequency being substantially higher than an average frequency of the input clock signal $CLK_{in}$. Typically, the sampling clock signal $CLK_{smpl}$ has a frequency in the range 50 MHz to 10 GHz, and the input clock signal $CLK_{in}$ has a frequency several factors lower. For instance, the input clock signal $CLK_{in}$ may have a frequency of 2 MHz, and in such a case the sampling clock signal $CLK_{smpl}$ may for instance have a frequency around 1 GHz. Given the relationship 2 MHz/1 GHz, for each period of the input clock signal $CLK_{in}$ the sampling clock signal $CLK_{smpl}$ will typically complete 500 cycles, i.e. an integer number. The sampling unit 110 is further configured to sample the input clock signal $CLK_{in}$ based on the sampling clock signal $CLK_{smpl}$, and produce a respective period length value PL for each period of the input clock signal $CLK_{in}$.

The sampling unit 110 preferably outputs at least 6 bits to express the period length value PL. 6 bits are sufficient for periods up to a value of 63. However, in some implementations as few as 2 bits may be adequate, whereas in other cases jitter may require the use of more bits, and if occasional breaks in the input clock signal $CLK_{in}$ are to be tolerated, 16 bits may prove necessary. With 16 bits, breaks in the input clock of 0.05 ms are acceptable without overflow, provided the frequencies mentioned above. The sampling unit 110 preferably also generates an output signal expressing an "overflow flag". Namely, it is important that it is possible to detect any need for resynchronization of the clock regenerator. If the unit is not resynchronized after such an overflow, the phase difference between the input clock signal $CLK_{in}$ and the output clock signal $CLK_{out}$ will be changed in an unpredictable way.

The averaging unit 120 is configured to receive a number of period length values PL from the sampling unit 110, and based thereon produce an average period length value $PL_{avg}$ representing an average period time for the input clock signal $CLK_{in}$ over an averaging interval including a number of periods equivalent to said number of period length values PL. For example, the averaging interval may include 256 period length values PL (i.e. $2^N$, where N=8), and in such a case, the averaging unit 120 produces average period length values $PL_{avg}$, where each average period length value $PL_{avg}$ represents the average period time for a historic interval including 256 cycles of the input clock signal $CLK_{in}$.

The averaging unit 120 is either configured to update the average period length value $PL_{avg}$ on a rolling or a non-rolling basis. In the former case, the averaging unit 120 updates the average period length value $PL_{avg}$, such that each non-initial average period length value $PL_{avg}$ represents an averaging interval overlapping a foregoing averaging interval. If, however, the averaging unit 120 is configured to update the average period length value $PL_{avg}$ on a non-rolling basis, the average period length value $PL_{avg}$ is updated at a predefined interval equivalent to at least two periods of the input clock signal $CLK_{in}$, such that each average period length value $PL_{avg}$ represents an averaging interval being free from overlaps with any foregoing averaging intervals.

In any case, the output unit 150 is configured to produce the stabilized output clock signal $CLK_{out}$ based on the average period length value $PL_{avg}$ and the sampling clock signal $CLK_{smpl}$. Since the stabilized output clock signal $CLK_{out}$ is based on the sampling clock signal $CLK_{smpl}$, it is highly advantageous if each period of the output clock signal $CLK_{out}$ corresponds to an integer number of periods of the sampling clock signal $CLK_{smpl}$. Naturally, although the sampling clock signal $CLK_{smpl}$ has a frequency several factors (say 500) higher than the input clock signal $CLK_{in}$, it may be the case that the average period length value $PL_{avg}$ is not equal an exact integer number of sampling clock cycles. Therefore, in order to avoid systematic errors, according to one preferred embodiment of the invention, the averaging unit 120 is configured to operate as follows.

The averaging unit 120 produces the average period length value $PL_{avg}$, such that the average period length value $PL_{avg}$ does equal the duration of an integer number of periods of the sampling clock signal $CLK_{smpl}$. However, the averaging unit 120 also determines a rounding error value REV representing a difference between a calculated average period length $PL_{cavg}$ for the averaging interval and the average period length value $PL_{avg}$. Then, when producing a future average period length value $PL_{avg}$, the averaging unit 120 compensates for the rounding error value REV, so that a long time average of the average period length value $PL_{avg}$ becomes equal to a long time average of the calculated period length $PL_{cavg}$. Consequently, it does not matter whether the average period length value $PL_{avg}$ is rounded up or down relative to the calculated average period length $PL_{cavg}$ because this is compensated for later.

Table 1 below illustrates, via a decimal-value example, how the average period length value $PL_{avg}$ is determined over a rolling averaging interval of four cycles of the input clock signal $CLK_{in}$, and how based thereon, a stabilized output clock signal $CLK_{out}$ is produced.

Column 2 of Table 1 represents values of the periods of the input clock $CLK_{in}$. As can be seen, the input clock signal $CLK_{in}$ here has a period length of the decimal value 8 during the initial 4 rows. Then, between row 5 and 11, the period length increases to the decimal value 14; and finally, as of row 12, the period length drops to the decimal value 4.

Column 3 of Table 1 shows the rolling sum of four period length values PL. Note that we assume that there is one row's delay in the calculation. This becomes apparent for example on row 5 when the period length value PL changes from 8 to 14, and the rolling sum changes first on row 6.

Column 4 of Table 1 shows a so-called corrected rolling sum. A first correction here occurs on row 7, where an error term from the preceding row (i.e. row 6) in the column 7 is added. The error term of column 7 compensates for any difference between the calculated average period length $PL_{cavg}$ and the average period length value $PL_{avg}$, and is discussed further below with reference to column 7.

Column 5 of Table 1 shows an average value of the corrected rolling sum obtained by dividing the value of column 4 by four, which is here the number of period length values PL over which averaging is performed to determine the average period length value $PL_{avg}$.

Column 6 of Table 1 shows the value of column 5 rounded down to an integer number. Please note the numbers in column 6 correspond to the period length values of the output clock signal $CLK_{out}$, and these period length values, in turn, can be regarded as a low-pass filtered version of the period length values PL of the input clock signal $CLK_{in}$.

Column 7 values of Table 1 at each row represent an error term that is obtained by subtracting the value in column 5 from the value in column 6, and then multiplying this value by 4 (i.e. representing the averaging interval).

The respective time points at which each cycle of the input clock signal $CLK_{in}$ starts are obtained by accumulating the period length values PL in column 2. Column 8 of Table 1 represents these time points, which likewise correspond to the number of clock pulses of the sampling clock $CLK_{smpl}$ received since time zero.

Preferably, an offset number (relatively large) is added to an initial calculated point in time for the output clock signal $CLK_{out}$. Thereby, any non-causal behavior caused by lower frequencies, jitter and phase modulation can be handled by the clock regenerator.

In the first rows of columns 10 and 9, it is apparent that the pulses of the output clock signal $CLK_{out}$ are created 15 sampling clock pulses after the point in time when the clock regenerator is "aware" of that this clock pulse in question shall be produced.

This means that as long as the input clock signal $CLK_{in}$ has the period length 8, there is a margin to non-causal behavior of 15 (i.e. up to row 4). However, when the frequency decreases, so that the period length becomes 14, the margin has been reduced to 0.

TABLE 1

| | Column | | | | | | | | |
|---|---|---|---|---|---|---|---|---|---|
| Row | 2<br>Input period length, PL | 3<br>Rolling sum | 4<br>Corr. rolling sum | 5<br>Av. of corr. rolling sum | 6<br>Output, rounded down | 7<br>REV | 8<br>Input time | 9<br>Output time | 10<br>Output time + offset |
| 1 | 8 | 32 | 32 | 8 | 8 | 0 | 8 | 8 | 23 |
| 2 | 8 | 32 | 32 | 8 | 8 | 0 | 16 | 16 | 31 |
| 3 | 8 | 32 | 32 | 8 | 8 | 0 | 24 | 24 | 39 |
| 4 | 8 | 32 | 32 | 8 | 8 | 0 | 32 | 32 | 47 |
| 5 | 14 | 32 | 32 | 8 | 8 | 0 | 46 | 40 | 55 |
| 6 | 14 | 38 | 38 | 9.5 | 9 | 2 | 60 | 49 | 64 |
| 7 | 14 | 44 | 46 | 11.5 | 11 | 2 | 74 | 60 | 75 |
| 8 | 14 | 50 | 52 | 13 | 13 | 0 | 88 | 73 | 88 |
| 9 | 14 | 56 | 56 | 14 | 14 | 0 | 102 | 87 | 102 |
| 10 | 14 | 56 | 56 | 14 | 14 | 0 | 116 | 101 | 116 |
| 11 | 14 | 56 | 56 | 14 | 14 | 0 | 130 | 115 | 130 |
| 12 | 4 | 56 | 56 | 14 | 14 | 0 | 134 | 129 | 144 |
| 13 | 4 | 46 | 46 | 11.5 | 11 | 2 | 138 | 140 | 155 |
| 14 | 4 | 36 | 38 | 9.5 | 9 | 2 | 142 | 149 | 164 |
| 15 | 4 | 26 | 28 | 7 | 7 | 0 | 146 | 156 | 171 |
| 16 | 4 | 16 | 16 | 4 | 4 | 0 | 150 | 160 | 175 |
| 17 | 4 | 16 | 16 | 4 | 4 | 0 | 154 | 164 | 179 |
| 18 | 4 | 16 | 16 | 4 | 4 | 0 | 158 | 168 | 183 |
| 19 | 4 | 16 | 16 | 4 | 4 | 0 | 162 | 172 | 187 |
| 20 | 4 | 16 | 16 | 4 | 4 | 0 | 166 | 176 | 191 |

Column 9 specifically shows the points in time for the pulses of the output clock signal $CLK_{out}$. The values in column 8 have been obtained simply by accumulating the numbers in column 2 up to a given row.

Note that in row 5 the output number of column 9 is 40, while the input number of column 8 is 46 (i.e. a higher number). This is an example of a so-called non-causal behavior, which cannot occur in a real system. The problem behind this phenomenon is that the information needed to create a pulse of the output clock signal $CLK_{out}$ at the point in time t=40 is not obtained until the point in time t=46.

This non-causal behavior is explained by the fact that the frequency of the input clock signal $CLK_{in}$ decreases on row 5, while the input period length values PL increase from 8 to 14. To eliminate the non-causal behavior, a sufficiently large offset number is added to the calculated points time when the pulses of the output clock signal $CLK_{out}$ are to be generated. Here, we have chosen an offset of 15, which is represented in column 10 of Table 1. As can be seen, some input points in time (column 8) are identical to some output points in time (column 10). This means that the system is at the very brink of non-causal behavior. Thus, here, 15 is indeed the minimal possible offset value.

According to one preferred embodiment of the invention, the averaging unit 120 is configured to calculate the average period length value $PL_{avg}$ on the further basis of a weight function that assigns different weights to at least two period length values PL included in the averaging interval. Thereby, the responsiveness of the output clock signal $CLK_{out}$ to any frequency fluctuations in the input clock signal $CLK_{in}$ can be controlled. By giving more influence to relatively recent period length values, a quicker response is attained; and vice versa, by giving more influence to relatively old period length values, the output clock signal $CLK_{out}$ becomes less responsive, but shows a more stable behavior.

Moreover, analogous to the average period length value $PL_{avg}$, the calculated average period length $PL_{cavg}$ may either be updated on a rolling or a non-rolling basis. Of course, the principle (rolling or non-rolling) applied to one of the parameters must likewise be applied to the other. Thus, according to one preferred embodiment of the invention, the averaging unit 120 is configured to update the calculated average period length $PL_{cavg}$ on a rolling basis. This means that each non-initial calculated average period length $PL_{cavg}$ represents an averaging interval overlapping a foregoing averaging interval. According to another preferred embodiment of the invention, the averaging unit 120 is instead configured to update the calculated average period length $PL_{cavg}$ on a non-rolling basis. Here, the calculated average period length $PL_{cavg}$ is updated at a predefined interval equivalent to at least two periods of the input clock signal $CLK_{in}$, such that each calculated average period length $PL_{cavg}$ represents an averaging interval being free from overlaps with any foregoing averaging intervals.

As mentioned above, the clock regenerator preferably includes an accumulator unit 130. This unit is configured to receive each average period length value $PL_{avg}$ and based thereon produce a respective time point value TPV indicating a time point at which a given pulse of the stabilized output clock signal $CLK_{out}$ shall be generated (cf. columns 9 and 10 in Table 1).

Further preferably, the clock regenerator also includes a buffer unit 140. The buffer unit 140 is configured to receive said time point values TPV from the accumulator unit 130, and temporarily store at least one of these values. The output unit 150 is then configured to read out an oldest value of said time point values TPV stored in the buffer unit 140. For each read-out time point value TPV, the output unit 150 is configured to produce a pulse of the stabilized output clock signal $CLK_{out}$ at a time point indicated by the read-out time point value TPV.

To keep track of time, it is beneficial if the clock regenerator includes a counter unit 160 configured to repeatedly produce a time value count TVC representing a number of cycles completed by the sampling clock signal $CLK_{smpl}$ since a reference time point, say time zero. The output unit 150 is further configured to receive the time value count TVC and compare the time value count TVC with the time point value TPV read out from the buffer unit 140. When time value count TVC matches the current time point value TPV, the output unit 150 is configured to produce a pulse of the stabilized output clock signal $CLK_{out}$. Thereafter, the output unit 150 reads out a subsequent time point value TPV from the buffer unit 140, and so on.

For additional flexibility in terms of timing adjustment, the clock regenerator according to one preferred embodiment of the invention includes a frequency conversion unit 170. This unit is configured to receive the sampling clock signal $CLK_{smpl}$ and based thereon produce a modified sampling clock signal $CLK'_{smp}$. The modified sampling clock signal $CLK'_{smp}$ has a frequency being either a predetermined factor higher than the sampling clock signal $CLK_{smpl}$, or a predetermined fraction of the sampling clock signal $CLK_{smpl}$. The output unit 150 is here configured to receive the modified sampling clock signal $CLK'_{smp}$ and use this signal as a basis for the stabilized output clock signal $CLK_{out}$. Thus, the points in time at which the pulses of the stabilized output clock signal $CLK_{out}$ are generated can be adjusted to some extent, for instance to match a given time frame.

Preferably, the clock regenerator includes a processor unit 180, which in turn is associated with a computer readable medium 185 (e.g. in the form of a memory module) in such a manner that the processor unit 180 has access to the contents of this medium 185. Furthermore, a program is recorded in the computer readable medium 185, and the program is adapted to make the processor unit 180 control the process described above, as well as the embodiments further elaborated on below, when the program is run on the processor unit 180.

As can be seen in FIG. 1, all units 110, 120, 130 and 140 receive the input clock signal $CLK_{in}$. This arrangement makes the clock regenerator fully synchronous and thus eliminates the risk of so-called metastability. Alternatively, a set of latches (including one or more latches) can be included in the design, which set of latches is common to said units, and is configured to convert the asynchronous input clock signal $CLK_{in}$ to a synchronous clock signal to units 110, 120, 130 and 140 respectively.

Figure 2:
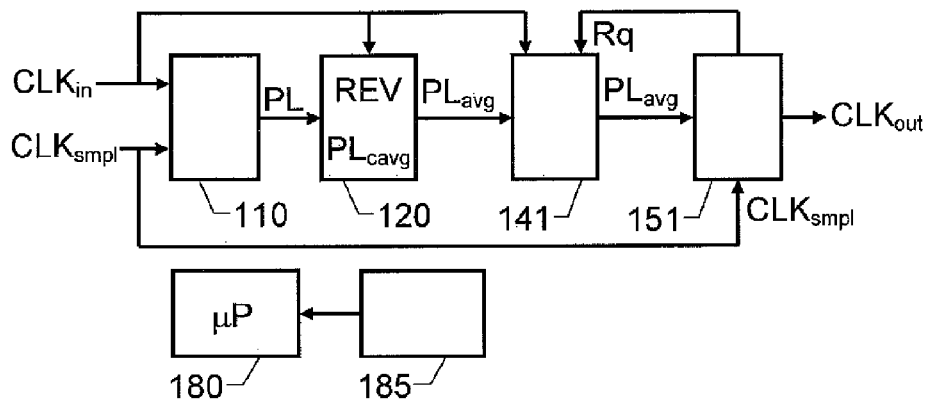
FIG. 2 shows a block diagram of a clock regenerator according to a second embodiment of the invention.

FIG. 2 shows a block diagram of a clock regenerator according to a second embodiment of the invention. In FIG. 2, all units, signals and values bearing the same reference signs as those also occurring in FIG. 1 designate the same units, signals and values respectively as described above with reference to FIG. 1, and will therefore not be repeated below.

In the embodiment of FIG. 2, there is no accumulator unit 130 or counter unit 160. As a result, an included buffer unit 141 and output unit 151 are slightly different from what has been described above referring to the units 140 and 150 respectively.

More precisely, the buffer unit 141 is configured to: receive the average period length value $PL_{avg}$ from the averaging unit 120, store, temporarily, each received average period length value $PL_{avg}$, and forward the stored average period length values $PL_{avg}$ on a first-in-first-out basis to the output unit 151. This forwarding is executed in response to request messages Rq, i.e. for each received request message Rq, the buffer unit 141 forwards an oldest stored average period length value $PL_{avg}$. The output unit 151, in turn, is configured to receive the average period length value $PL_{avg}$ from the buffer unit 141, and produce the stabilized output clock signal $CLK_{out}$ such that each period thereof has a duration as indicated by a latest received average period length value $PL_{avg}$. After completion of each period of the output clock signal $CLK_{out}$, the output unit 151 is configured to send a request message Rq to the buffer unit 141, so that another average period length value $PL_{avg}$ is forwarded from the buffer unit 141, and so on.

Figure 3:
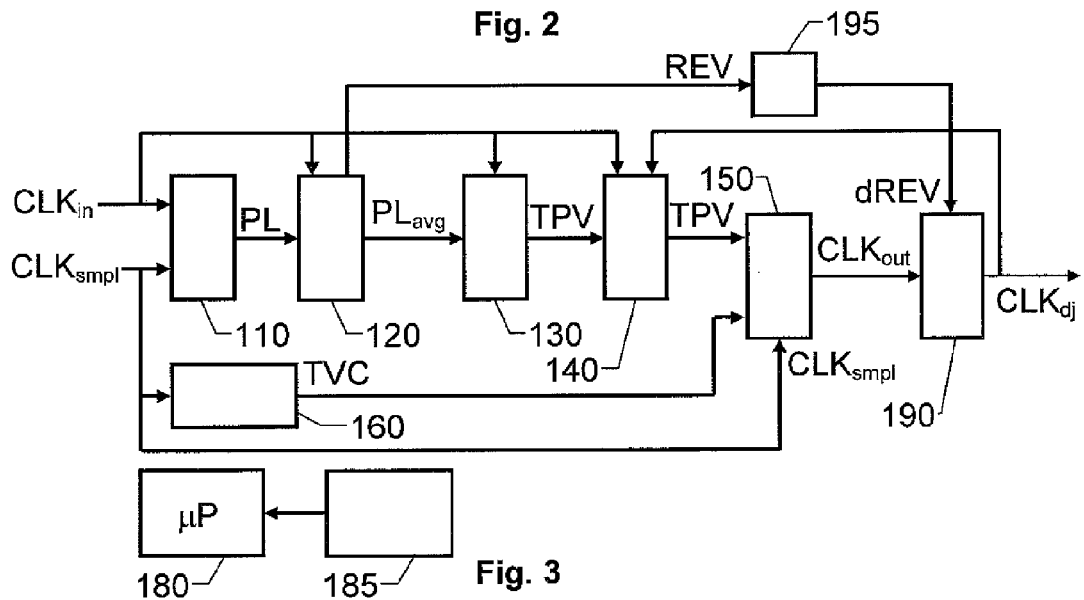
FIG. 3 shows a block diagram of a clock regenerator according to a third embodiment of the invention.

FIG. 3 shows a block diagram of a clock regenerator according to a third embodiment of the invention. In FIG. 3, all units, signals and values bearing the same reference signs as those also occurring in FIGS. 1 and/or 2 designate the same units, signals and values respectively as described above, and will therefore not be repeated below.

The proposed clock regenerator may under certain circumstances cause high frequency jitter in the output clock signal $CLK_{out}$, where the jitter is of the same magnitude as the period of the sampling clock signal $CLK_{smpl}$. To mitigate this problem, the clock regenerator embodiment represented in FIG. 3 includes a delay adjustment unit 190 and a delaying unit 195.

The delaying unit 195 is configured to: receive at least one rounding error value REV from the averaging unit 120, delay each of said received at least one rounding error value REV, and thus produce a respective delayed rounding error value dREV. The delay adjustment unit 190 is configured to: receive the stabilized output clock signal $CLK_{out}$ produced by the output unit 150 and receive the delayed rounding error value dREV from the delaying unit 195. In response to the received signal $CLK_{out}$ and the value dREV, the delay adjustment unit 190 is configured to produce a de-jittered clock signal $CLK_{dj}$, which is delayed relative to output clock signal $CLK_{out}$. The delay is here a function of the delayed rounding error value dREV. Specifically, the delaying unit 195 is configured to delay each received rounding error value REV, such that in the delay adjustment unit 190 the respective delayed rounding error value dREV influences a period of the output clock signal $CLK_{out}$ to which the rounding error value REV in question relates. In practice, this is normally equivalent to the delay of the time point value TPV caused by the buffer unit 140. However, since the time point value TPV may also be delayed relative to the average period length value $PL_{avg}$, the delaying unit 195 may need to introduce yet some additional delay.

If for example the sampling clock signal $CLK_{smpl}$ has a frequency of 1 GHz, the high frequency output jitter will, due to the sampling clock, be of the magnitude 1 ns peak to peak. This phenomenon is analogous to the quantization error occurring in a digital-to-analog converter, however here the error is in the time dimension (e.g. represented in ns) instead of in the amplitude dimension (e.g. represented in mV).

Due to the sampling clock frequency, forwarding the rounding error value REV from the averaging unit 120 to the delay adjustment unit 190 enables a reduction of the output jitter with a factor of A, where A is the number of periods over which averaging is performed, i.e. A equals the averaging interval.

Returning to the above example, if the sampling frequency is 1 GHz, each increment of the rounding error value REV represented by eight bits ($2^8$=256) corresponds to an increase of the delay by 1 ns/256=3.9 ps. Mathematically, this can be expressed as:

$$\text{Delay\_increase} = \frac{REV}{f_s \cdot A}$$

where $f_s$ is the frequency of the sampling clock signal $CLK_{smpl}$.

Let us study an extreme, however feasible example. Assume that the sampling clock signal $CLK_{smpl}$ has a frequency $f_s$=5 GHz and the averaging interval A includes 2048 periods of the input clock signal $CLK_{in}$ (2048=$2^{11}$, which means that 11 bits are required to represent the delay necessary). Then the resolution R (or output jitter) becomes:

$$R = \frac{1}{5 \cdot 10^9 \cdot 2048} = 0.098 \text{ ps.}$$

The value 0.098 ps is very small, and substantially smaller than the normal jitter of any known PLL, which at best has a peak to peak jitter of 4 ps (measured from 50 kHz and upwards).

Figure 4:
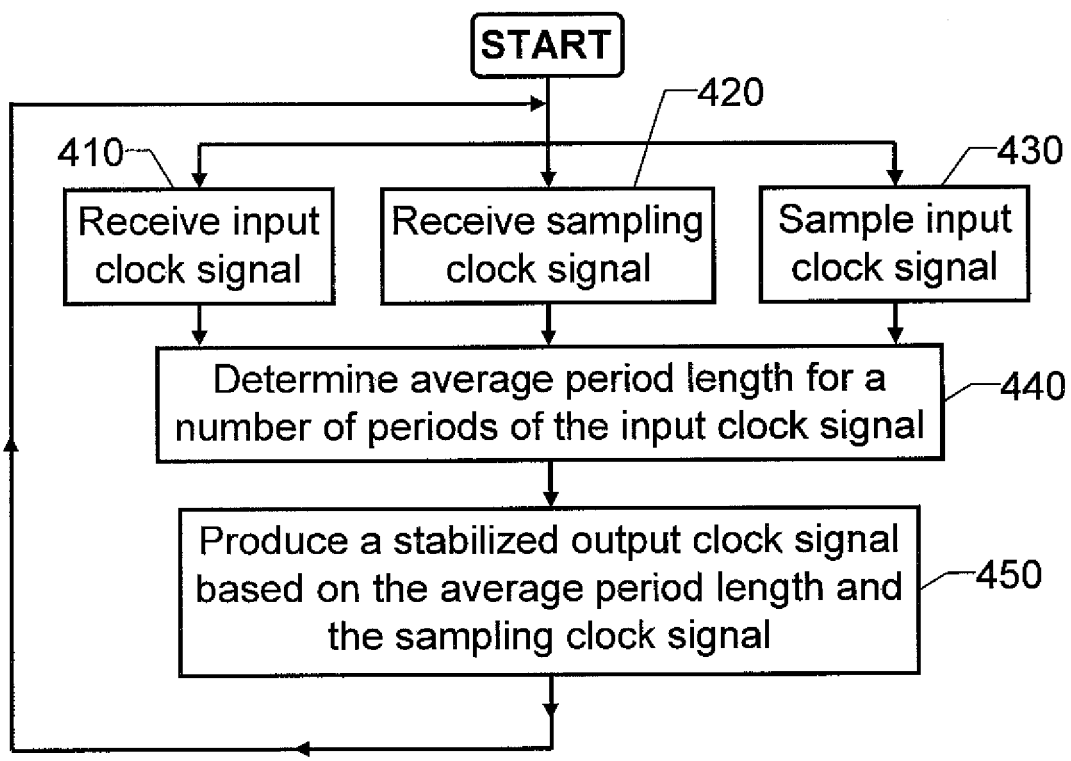
FIG. 4 illustrates, by means of a flow diagram, a general method of generating a stabilized output clock signal according to the invention.

To sum up, we will now describe the general method of producing a stabilized output clock signal according to the invention with reference to the flow diagram in FIG. 4.

An initial step 410 receives an input clock signal having a varying period time. In parallel with step 410, a step 420 receives a sampling clock having a frequency being substantially higher than an average frequency of the input clock signal. A step 430, parallel to both steps 410 and 420, samples the input clock signal based on the sampling clock, and generates a respective period length value for each period of the input clock signal. Here, the period length values reflect the duration of different clock signal cycles.

Thereafter, a step 440 determines an average period length value representing an average period time for the input clock signal over a number of periods of the signal.

Subsequently, a step 450 produces a stabilized output clock signal based on the average period length value and the sampling clock. Finally, the procedure loops back to steps 410, 420 and 430 again.

Naturally, the above steps are only executed in chronological order with respect to individual pieces of data, such that when for example step 440 is executed with respect to certain samples, steps 410 to 430 are simultaneously executed with respect to later produced samples, and so on.

All of the steps, as well as any sub-sequence of steps, described with reference to FIG. 4, above may be controlled by means of a programmed computer apparatus. Moreover, although the embodiments of the invention described above with reference to the drawings comprise computer apparatus and processes performed in computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the procedure according to the invention. The program may either be a part of an operating system, or be a separate application. The carrier may be any entity or device capable of carrying the program. For example, the carrier may comprise a storage medium, such as a Flash memory, a ROM, for example a DVD, a CD, an EPROM, an EEPROM, or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant procedures.

The term "comprises/comprising" when used in this specification is taken to specify the presence of stated features, integers, steps or components. However, the term does not preclude the presence or addition of one or more additional features, integers, steps or components or groups thereof.

The reference to any prior art in this specification is not, and should not be taken as, an acknowledgement or any suggestion that the referenced prior art forms part of the common general knowledge in Australia, or in any other country.

The invention is not restricted to the described embodiments in the figures, but may be varied freely within the scope of the claims.

The invention claimed is:

1. A clock regenerator for generating a stabilized output clock signal ($CLK_{out}$), the clock regenerator comprising:
 a sampling unit (110) configured to receive an input clock signal ($CLK_{in}$) having a varying period time, receive a sampling clock signal ($CLK_{smpl}$) and sample the input clock signal ($CLK_{in}$) based on the sampling clock signal ($CLK_{smpl}$) to produce a respective period length value (PL) for each period of the input clock signal ($CLK_{in}$), the sampling clock signal ($CLK_{smpl}$) having a frequency being substantially higher than an average frequency of the input clock signal ($CLK_{in}$);
 an averaging unit (120) configured to receive a number of period length values (PL) from the sampling unit (110) and based thereon produce an average period length value ($PL_{avg}$) representing an average period time for the input clock signal ($CLK_{in}$) over an averaging interval including a number of periods equivalent to said number of period length values (PL);
 an output unit (150, 151) configured to produce the stabilized output clock signal ($CLK_{out}$) based on the average period length value ($PL_{avg}$) and the sampling clock signal ($CLK_{smpl}$); and an accumulator unit (130) configured to receive each average period length value ($PL_{avg}$) and based thereon produce a value (TPV) indicating a time point at which a given pulse of the stabilized output clock signal ($CLK_{out}$) shall be generated.

2. The clock regenerator according to claim 1, wherein the averaging unit (120) is configured to:
produce the average period length value ($PL_{avg}$) such that the average period length value ($PL_{avg}$) equals the duration of an integer number of periods of the sampling clock signal ($CLK_{smpl}$);
determine a rounding error value (REV) representing a difference between a calculated average period length ($PL_{cavg}$) for the averaging interval and the average period length value ($PL_{avg}$); and
compensate for the rounding error value (REV) when producing a future average period length value ($PL_{avg}$) such that a long time average of the average period length value ($PL_{avg}$) becomes equal to a long time average of the calculated period length ($PL_{cavg}$).

3. The clock regenerator according to claim 1, wherein the averaging unit (120) is configured to calculate the average period length value ($PL_{avg}$) on the further basis of a weight function assigning different weights to at least two period length values (PL) of said number of period length values (PL) in the averaging interval.

4. The clock regenerator according to claim 1, wherein the averaging unit (120) is configured to update the average period length value ($PL_{avg}$) on a rolling basis, such that each non-initial average period length value ($PL_{avg}$) represents an averaging interval overlapping a foregoing averaging interval.

5. The clock regenerator according to claim 1, wherein the averaging unit (120) is configured to update the calculated average period length ($PL_{cavg}$) on a rolling basis, such that each non-initial calculated average period length ($PL_{cavg}$) represents an averaging interval overlapping a foregoing averaging interval.

6. The clock regenerator according to claim 1, wherein the averaging unit (120) is configured to update the average period length value ($PL_{avg}$) at a predefined interval equivalent to at least two periods of the input clock signal ($CLK_{in}$), such that each average period length value ($PL_{avg}$) represents an averaging interval being free from overlaps with any foregoing averaging intervals.

7. The clock regenerator according to claim 1, further comprising a buffer unit (140) configured to:
receive said time point values (TPV) from the accumulator unit (130); and
temporarily store at least one of said time point values (TPV).

8. The clock regenerator according to claim 7, wherein the output unit (150) is configured to:
read out an oldest value of said time point values (TPV) stored in the buffer unit (140), and for each read-out time point value (TPV); and
produce a pulse of the stabilized output clock signal ($CLK_{out}$) at a time point indicated by the read-out time point value (TPV).

9. The clock regenerator according to claim 8, further comprising a counter unit (160) configured to repeatedly produce a time value count (TVC) representing a number of cycles completed by the sampling clock signal ($CLK_{smpl}$) since a reference time point, the output unit (150) being configured to:
receive the time value count (TVC);
compare the time value count (TVC) with the time point value (TPV) read out from the buffer unit (140);
when time value count (TVC) matches the current time point value (TPV), produce a pulse of the stabilized output clock signal ($CLK_{out}$); and
thereafter read out a subsequent time point value (TPV) from the buffer unit (140).

10. The clock regenerator according to claim 1, further comprising a buffer unit (141) configured to:
receive the average period length value ($PL_{avg}$) from the averaging unit (120);
store, temporarily, each received average period length value ($PL_{avg}$); and
forward the stored average period length values ($PL_{avg}$) on a first-in-first-out basis to the output unit (151) in response to request messages (Rq), such that for each received request message (Rq) an oldest stored average period length value ($PL_{avg}$) is forwarded.

11. The clock regenerator according to claim 10, wherein the output unit (151) is configured to:
receive the average period length value ($PL_{avg}$) from the buffer unit (141);
produce the stabilized output clock signal ($CLK_{out}$) such that each period thereof has a duration as indicated by a latest received average period length value ($PL_{avg}$); and
send a request message (Rq) to the buffer unit (141) after completion of each period of the output clock signal ($CLK_{out}$).

12. The clock regenerator according to claim 2, further comprising:
a delaying unit (195) configured to: receive at least one rounding error value (REV) from the averaging unit (120), delay each of said received at least one rounding error value (REV), and thus produce a respective delayed rounding error value (dREV); and
a delay adjustment unit (190) configured to: receive the stabilized output clock signal ($CLK_{out}$) produced by the output unit (150, 151), receive the delayed rounding error value (dREV) from the delaying unit (195), and in response thereto produce a de-jittered clock signal ($CLK_{dj}$) which is delayed relative to the output clock signal ($CLK_{out}$) produced by the output unit (150, 151), where the delay is a function of the delayed rounding error value (dREV), and the delaying unit (195) is configured to delay each of said received at least one rounding error value (REV) such that in the delay adjustment unit (190) the respective delayed rounding error value (dREV) influences a period of the output clock signal ($CLK_{out}$) to which the rounding error value (REV) in question relates.

13. The clock regenerator according to claim 1, further comprising a frequency conversion unit (170) configured to receive the sampling clock signal ($CLK_{smpl}$) and based thereon produce a modified sampling clock signal ($CLK'_{smpl}$) having a frequency being a predetermined factor higher than the sampling clock signal ($CLK_{smpl}$) or a predetermined fraction of the sampling clock signal ($CLK_{smpl}$), the output unit (150, 151) is configured to receive the modified sampling clock signal ($CLK'_{smpl}$) and based thereon produce the stabilized output clock signal ($CLK_{out}$).

14. A method of generating a stabilized output clock signal ($CLK_{out}$), the method comprising the steps of:
receiving an input clock signal ($CLK_{in}$) having a varying period time;
sampling the input clock signal ($CLK_{in}$) based on a sampling clock ($CLK_{smpl}$) to produce a respective period length value (PL) for a number of periods of the input clock signal ($CLK_{in}$), the sampling clock ($CLK_{smpl}$)

having a frequency being substantially higher than an average frequency of the input clock signal ($CLK_{in}$);

averaging the period length values (PL) over a number of periods equivalent to said number of period length values (PL) to produce an average period length value ($PL_{avg}$) representing an average period time for the input clock signal ($CLK_{in}$) over an averaging interval including a number of periods equivalent to said number of period length values (PL);

producing the stabilized output clock signal ($CLK_{out}$) based on the average period length value ($PL_{avg}$) and the sampling clock ($CLK_{smpl}$);

receiving each average period length value ($PL_{avg}$); and based thereon, producing a respective time point value (TPV) indicating a time point at which a given pulse of the output clock signal ($CLK_{out}$) shall be generated.

15. The method according to claim 14, further comprising the steps of:

producing the average period length value ($PL_{avg}$) such that the average period length value ($PL_{avg}$) equals the duration of an integer number of periods of the sampling clock signal ($CLK_{smpl}$);

determining a rounding error value (REV) representing a difference between a calculated average period length ($PL_{cavg}$) for the averaging interval and the average period length value ($PL_{avg}$); and compensating for the rounding error value (REV) when producing a future average period length value ($PL_{avg}$) such that a long time average of the average period length value ($PL_{avg}$) becomes equal to a long time average of the calculated period length ($PL_{cavg}$).

16. The method according to claim 14, further comprising the step of calculating the average period length value ($PL_{avg}$) on the further basis of a weight function assigning different weights to at least two period length values (PL) of said number of period length values (PL) in the averaging interval.

17. The method according to claim 14, further comprising the step of updating the average period length value ($PL_{avg}$) on a rolling basis, such that each non-initial average period length value ($PL_{avg}$) represents an averaging interval overlapping a foregoing averaging interval.

18. The method according to claim 14, further comprising the step of updating the calculated average period length ($PL_{cavg}$) on a rolling basis, such that each non-initial average period length value ($PL_{cavg}$) represents an averaging interval overlapping a foregoing averaging interval.

19. The method according to claim 14, further comprising the step of updating the average period length value ($PL_{avg}$) at a predefined interval equivalent to at least two periods of the input clock signal ($CLK_{in}$), such that each average period length value ($PL_{avg}$) represents an averaging interval being free from overlaps with any foregoing averaging intervals.

20. The method according to claim 14, further comprising the step of temporarily storing at least one of said time point values (TPV) in a buffer unit (140).

21. The method according to claim 20, further comprising the steps of:

reading out an oldest value of said time point values (TPV) stored in the buffer unit (140); and for each read-out time point value (TPV), producing a pulse of the stabilized output clock signal ($CLK_{out}$) at a time point indicated by the read-out time point value (TPV).

22. The method according to claim 21, further comprising the steps of:

producing, repeatedly, a time value count (TVC) representing a number of cycles completed by the sampling clock signal ($CLK_{smpl}$) since a reference time point;

comparing the time value count (TVC) with the time point value (TPV) read out from the buffer unit (140), and when time value count (TVC) matches the current time point value (TPV);

producing a pulse of the stabilized output clock signal ($CLK_{out}$); and thereafter reading out a subsequent time point value (TPV) from the buffer unit (140).

23. The method according to claim 14, further comprising the steps of:

receiving in a buffer unit (141) the average period length value ($PL_{avg}$) from the averaging unit (120);

storing temporarily, each received average period length value ($PL_{avg}$) in the buffer unit (141); and forwarding the stored average period length values ($PL_{avg}$) from the buffer unit (141) on a first-in-first-out basis in response to request messages (Rq), such that for each received request message (Rq) an oldest stored average period length value ($PL_{avg}$) is forwarded.

24. The method according to claim 23, further comprising the steps of:

receiving the average period length value ($PL_{avg}$) from the buffer unit (141);

producing the stabilized output clock signal ($CLK_{out}$) such that each period thereof has a duration as indicated by a latest received average period length value ($PL_{avg}$); and sending a request message (Rq) to the buffer unit (141) after completion of each period of the output clock signal ($CLK_{out}$).

25. The method according to claim 15, further comprising the steps of:

delaying at least one rounding error value (REV);

producing at least one respective delayed rounding error value (dREV);

receiving the stabilized output clock signal ($CLK_{out}$);

receiving the delayed rounding error value (dREV); and in response thereto, producing a de-jittered clock signal ($CLK_{dj}$) which is delayed relative to the output clock signal ($CLK_{out}$), where the delay is a function of the delayed rounding error value (dREV), and said delaying has such duration that the respective received delayed rounding error value (dREV) influences a period of the output clock signal ($CLK_{out}$) to which the rounding error value (REV) in question relates.

26. The method according to claim 14, further comprising the steps of:

producing, based on the sampling clock signal ($CLK_{smpl}$), a modified sampling clock signal ($CLK'_{smpl}$) having a frequency being a predetermined factor higher than the sampling clock signal ($CLK_{smpl}$) or a predetermined fraction of the sampling clock signal ($CLK_{smpl}$); and producing the stabilized output clock signal ($CLK_{out}$) based on the modified sampling clock signal ($CLK'_{smpl}$) instead of on the sampling clock signal ($CLK_{smpl}$).

27. A computer program loadable into the memory (185) of a computer, said computer program comprising software for controlling the steps of the method according to claim 14 when said program is run on said computer.

28. A computer readable medium (185), having a program recorded thereon, wherein the program is configured to make a computer control the steps of the method according to claim 14 when the program is loaded into said computer.

* * * * *

UNITED STATES PATENT AND TRADEMARK OFFICE
CERTIFICATE OF CORRECTION

| | |
|---|---|
| PATENT NO. | : 8,629,702 B2 |
| APPLICATION NO. | : 13/576496 |
| DATED | : January 14, 2014 |
| INVENTOR(S) | : Forsberg |

It is certified that error appears in the above-identified patent and that said Letters Patent is hereby corrected as shown below:

In the claim

Column 13,
Claim 1 Line 3, "a value" should read --a respective time point value--.

Signed and Sealed this
Twentieth Day of May, 2014

Michelle K. Lee
*Deputy Director of the United States Patent and Trademark Office*